United States Patent
Gu

(10) Patent No.: US 11,910,947 B2
(45) Date of Patent: Feb. 27, 2024

(54) CONTROL DEVICE AND METHOD FOR PRESSURE COOKING APPLIANCE, AND PRESSURE COOKING APPLIANCE

(71) Applicant: FOSHAN SHUNDE MIDEA ELECTRICAL HEATING APPLIANCES MANUFACTURING CO., LTD., Foshan (CN)

(72) Inventor: Qingsong Gu, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 728 days.

(21) Appl. No.: 16/976,473

(22) PCT Filed: Aug. 9, 2018

(86) PCT No.: PCT/CN2018/099531
§ 371 (c)(1),
(2) Date: Aug. 28, 2020

(87) PCT Pub. No.: WO2019/184188
PCT Pub. Date: Oct. 3, 2019

(65) Prior Publication Data
US 2021/0000282 A1 Jan. 7, 2021

(30) Foreign Application Priority Data

Mar. 29, 2018 (CN) .......................... 201810271992.X

(51) Int. Cl.
*A47J 27/08* (2006.01)
*A47J 27/086* (2006.01)
*A47J 27/62* (2006.01)

(52) U.S. Cl.
CPC ......... *A47J 27/0802* (2013.01); *A47J 27/086* (2013.01); *A47J 27/62* (2013.01)

(58) Field of Classification Search
None
See application file for complete search history.

(56) References Cited

U.S. PATENT DOCUMENTS

2008/0308547 A1   12/2008   Zhang et al.

FOREIGN PATENT DOCUMENTS

| CN | 103799847 A | * | 5/2014 | ............ A47J 27/09 |
| CN | 105167591 A | * | 12/2015 | ............ A47J 27/08 |

(Continued)

OTHER PUBLICATIONS

Machine translation of CN 107692813 A performed on Apr. 12, 2023, Gu et al. (Year: 2018).*

(Continued)

*Primary Examiner* — Dana Ross
*Assistant Examiner* — Kevin Guanhua Wen

(57) ABSTRACT

Control equipment and method for pressure cooking appliance, and pressure cooking appliance. The equipment comprises: a temperature detecting device for detecting a temperature value within a pot of a pressure cooking appliance; a floater detecting device for detecting whether a floater of the pressure cooking appliance is in a floating state; and a control device used for: calculating a target temperature value according to a first temperature value detected by the temperature detecting device when the floater is in the floating state and a preset target pressure value, and controlling a heater of the pressure cooking appliance according (Continued)

to the target temperature value. The present disclosure can perform control by means of corresponding different target temperature values at different altitudes to achieve a target pressure, so that the quality of food cooked by the pressure cooking appliance would not be affected by the altitude.

15 Claims, 2 Drawing Sheets

(56) References Cited

FOREIGN PATENT DOCUMENTS

| CN | 205072660 U | * | 3/2016 | ............ A47J 27/08 |
| CN | 105630042 A | | 6/2016 | |
| CN | 105832133 A | * | 8/2016 | ......... A47J 27/0802 |
| CN | 105902151 A | | 8/2016 | |
| CN | 106667241 A | | 5/2017 | |
| CN | 107440469 A | * | 12/2017 | ......... A47J 27/0802 |
| CN | 107550232 A | | 1/2018 | |
| CN | 107616684 A | | 1/2018 | |
| CN | 107669105 A | | 2/2018 | |
| CN | 107692813 A | * | 2/2018 | ............ A47J 27/09 |
| DE | 102008051265 A1 | * | 4/2010 | ........... A47J 36/321 |

OTHER PUBLICATIONS

Machine translation of CN 103799847 A performed on Apr. 13, 2023, Gu et al. (Year: 2014).*
Machine translation of CN 107440469 A performed on Apr. 13, 2023, Xing et al. (Year: 2017).*
Machine translation of DE 102008051265 A1 performed on Apr. 13, 2023, Dollner et al. (Year: 2010).*
Machine translation of CN 105832133 A performed on Apr. 13, 2023, Wang et al. (Year: 2016).*
Machine translation of CN 205072660 U performed on Apr. 13, 2023, Wang et al. (Year: 2016).*
Machine translation of CN 105167591 A performed on Oct. 4, 2023, Lai et al. (Year: 2015).*
The extended European Search Report of EP Application No. 18912442.3.
International Search Report for PCT/CN2018/099531.

* cited by examiner and# CONTROL DEVICE AND METHOD FOR PRESSURE COOKING APPLIANCE, AND PRESSURE COOKING APPLIANCE

CROSS-REFERENCES TO RELATED APPLICATIONS

The present disclosure is a national phase application of International Application No. PCT/CN2018/099531, filed on Aug. 9, 2018, which claims the priority of Chinese Application No. 201810271992.X, filed in the Chinese Patent Office on Mar. 29, 2018, the entireties of which are herein incorporated by reference.

FIELD

The disclosure relates to the field of household appliances, in particular to a control equipment and method for pressure cooking appliance and a pressure cooking appliance.

BACKGROUND

According to an existing pressure cooking appliance, the pressure within the pot of the pressure cooking appliance is generally controlled by controlling the temperature within the pot by utilizing the positive correlation between pressure and temperature.

Although the temperature within the pot of the pressure cooking appliance has a positive correlation with the pressure, the pressure within the pot of the pressure cooking appliance in a high-altitude region will be greater than the pressure within the pot in a low-altitude region under the influence of the altitude even if the temperature within the pot in the high-altitude region is the same as the temperature within the pot in the low-altitude region. If the pressure cooking appliance controlling the pressure through a fixed temperature, the circumstance of product overpressure may occur in the high-altitude region because the pressure in the pot is excessively high, the circumstance of insufficient pressure may occur in the low-altitude region because the pressure in the pot is excessively low, and the two circumstances will both affect the quality of cooked food.

SUMMARY

An embodiment of the disclosure aims to provide a control equipment and method for pressure cooking appliance and a pressure cooking appliance to solve various problems with the prior art.

In order to achieve the foregoing purpose, an embodiment of the disclosure provides a control equipment for pressure cooking appliance, comprising: a temperature detection device, used for detecting a temperature value within a pot of the pressure cooking appliance, a floater detection device, used for detecting whether a floater of the pressure cooking appliance is in a floating state; and a control device, used for calculating a target temperature value according to a preset target pressure value and a first temperature value detected by the temperature detection device when the floater is in the floating state, and controlling a heater of the pressure cooking appliance according to the target temperature value.

In one embodiment, the control device is used for controlling the heater of the pressure cooking appliance according to following steps: judging whether the temperature value within the pot detected by the temperature detection device is greater than the target temperature value; controlling the heater to heat at a first heating power on a condition that the temperature value within the pot detected by the temperature detection device is not greater than the target temperature value; and controlling the heater to stop heating or controlling the heater to heat at a second heating power on a condition that the temperature value within the pot detected by the temperature detection device is greater than the target temperature value, characterized in that the second heating power is smaller than the first heating power.

In one embodiment, the control device is used for calculating the target temperature value according to following formula: $Tp=Tf+P/k$, and Tp is the target temperature value, Tf is the first temperature value, P is the preset target pressure value, and k is a coefficient value.

In one embodiment, the value of k is greater than or equal to 4 and smaller than or equal to 6, and may be 5.

In one embodiment, the floater detection device detects that the floater is not in the floating state, the control device is further used for: judging whether the temperature value within the pot detected by the temperature detection device is greater than the preset temperature value; controlling the heater to heat at a third heating power on a condition that the temperature value within the pot detected by the temperature detection device is not greater than the preset temperature value; and controlling the heater to heat at a fourth heating power on a condition that the temperature value within the pot detected by the temperature detection device is greater than the preset temperature value, and the fourth heating power is smaller than the third heating power.

In one embodiment, the preset temperature value is greater than or equal to 50 DEG C. and smaller than or equal to 80 DEG C., and is 60 DEG C.

Accordingly, an embodiment of the present disclosure further provides a pressure cooking appliance comprising the above mentioned control equipment for pressure cooking appliance.

Accordingly, an embodiment of the present disclosure further provides a control method for pressure cooking appliance, comprising: detecting a temperature value within a pot of the pressure cooking appliance; detecting whether a floater of the pressure cooking appliance is in a floating state; calculating a target temperature value according to a preset target pressure value and a first temperature value detected when the floater is in the floating state; and controlling a heater of the pressure cooking appliance according to the target temperature value.

In one embodiment, controlling the heater of the pressure cooking appliance comprising: judging whether the detected temperature value within the pot is greater than the target temperature value; controlling the heater to heat at a first heating power on a condition that the detected temperature value within the pot is not greater than the target temperature value; and controlling the heater to stop heating or controlling the heater to heat at a second heating power on a condition that the detected temperature value within the pot is greater than the target temperature value, and the second heating power is smaller than the first heating power.

In one embodiment, the target temperature value is calculated according to the following formula: $Tp=Tf+P/k$, and Tp is the target temperature value, Tf is the first temperature value, P is the preset target pressure value, and k is a coefficient value.

In one embodiment, the value of k is greater than or equal to 4 and smaller than or equal to 6, and may be 5.

In one embodiment, on a condition that it is detected that the floater is not in the floating state, the method further comprising: judging whether the detected temperature value within the pot is greater than the preset temperature value; controlling the heater to heat at a third heating power on a condition that the detected temperature value within the pot is not greater than the preset temperature value; and controlling the heater to heat at a fourth heating power on a condition that the detected temperature value within the pot is greater than the preset temperature value, and the fourth heating power is smaller than the third heating power.

In one embodiment, the preset temperature value is greater than or equal to 50 DEG C. and smaller than or equal to 80 DEG C., and is 60 DEG C.

In one embodiment, the floater is in the floating state when the temperature of water in the pot reaches the boiling point. For the same cooking appliance, the boiling points of water are different when the pressure cooking appliance is used at different altitudes, so that the detected temperatures are different when the floater is in the floating state, and the calculated target temperature values are also different when the target pressure values are the same. In other words, under the condition of different altitudes, the target pressure can be controlled to be reached by using the corresponding different target temperature values, so that the quality of food cooked by the pressure cooking appliance cannot be influenced by the altitudes, and the user experience is improved.

BRIEF DESCRIPTION OF THE DRAWINGS

The accompanying drawings, which are intended to provide a further understanding of embodiments of the disclosure and constitute a part of the specification, are used for explaining the embodiments of the disclosure together with the detailed description, but do not limit the embodiments of the disclosure. In the drawings.

DESCRIPTION OF REFERENCE NUMERALS

110—temperature detection device
120—floater detection device
130—control device
140—heater

DETAILED DESCRIPTION OF THE DISCLOSURE

The detailed description of embodiments of the disclosure is illustrated in detail below in conjunction with the drawings. It should be understood that the detailed description described herein is illustrative and explanatory only and are not restrictive of the embodiments of the disclosure.

Figure 1:
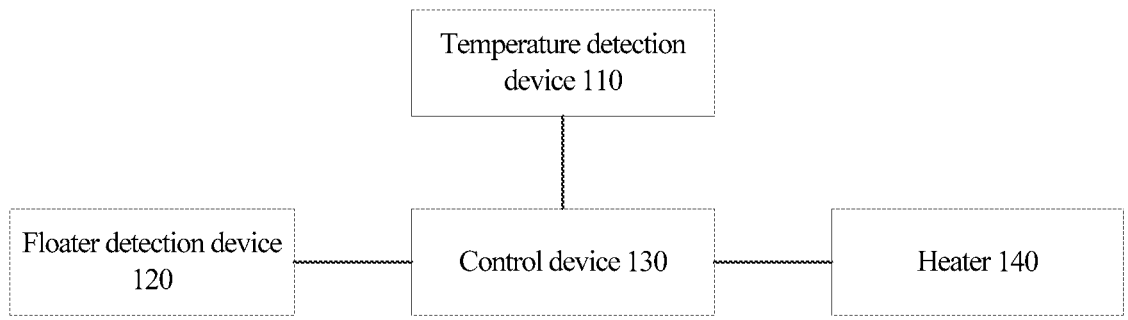
FIG. 1 shows a structural block diagram of a control equipment for pressure cooking appliance according to an embodiment of the disclosure.

FIG. 1 shows a structural block diagram of a control equipment for pressure cooking appliance according to an embodiment of the disclosure. As shown in FIG. 1, the embodiment of the disclosure provides a control equipment for pressure cooking appliance, a pressure cooking appliance may be a pressure cooker, for example, an electric pressure cooker or the like, the equipment may comprise a temperature detection device 110, used for detecting a temperature value within a pot of the pressure cooking appliance; a floater detection device 120, used for detecting whether a floater of the pressure cooking appliance is in a floating state, and under the condition that the temperature value within the pot reaches the boiling point, the floater is in the floating state; and a control device 130, used for calculating a target temperature value according to a preset target pressure value and a first temperature value detected by the temperature detection device 110 when the floater is in the floating state, and controlling a heater 140 of the pressure cooking appliance according to the target temperature value.

In one embodiment, the temperature detection device 110 can be a temperature sensor, and the temperature detection device 110 is generally arranged on a upper lid of the pressure cooking appliance, and is used for detecting the temperature of water vapor within the pot in real time, and taking the temperature of the water vapor within the pot as the temperature value within the pot.

Under the condition that the temperature value within the pot reaches the boiling point, the floater of the pressure cooking appliance can be in a floating state. The floater detection device 120 can detect whether the floater is in the floating state, and under the condition that the floater is in the floating state, the floater detection device 120 can send a signal to the control device 130, and the control device 130 can determine that the floater is in the floating state according to the signal sent by the floater detection device 120. In one embodiment, the floater can be provided with a magnetic piece, the floater detection device can be a magnetic sensitive element arranged above the floater. Under the condition that the floater is in the floating state, the magnetic sensitive element acts and sends a signal to the control device 130, and the control device 130 can determine that the floater is in the floating state according to the signal sent by the magnetic sensitive element. In one embodiment, the floater detection device 120 can be a mechanical switch, an infrared switch or a magnetic switch and the like, under the condition that the floater is made of a metal material, a coil can be arranged above the floater, and the floater detection device 120 can judge whether the floater is in the floating state by measuring change of magnetic induction intensity in the coil.

The control device 130 can be separately electrically connected with the temperature detection device 110 and the floater detection device 120, and In one embodiment, the control device 130 can also be integrated with a control panel of the pressure cooking appliance. The control device 130 can record a first temperature value detected by the temperature detection device 110 at the moment when the floater is in the floating state, and then calculates the target temperature value according to the first temperature value and the preset target pressure value. For the same cooking appliance, the boiling points of water are different when the cooking appliance is used at different attitudes, therefore, when the floater is in the floating state, the detected first temperature values are different, and the calculated target temperature values are also different under the condition that the target pressure values are the same. In other words, under the condition of different altitudes, target pressure is controlled to be reached by the corresponding different target temperature values, thus, the quality of food cooked by the pressure cooking appliance is not affected by the altitude, and user experiences are improved.

The control device 130 may calculate a target temperature value Tp according to the following formula: $Tp=Tf+P/k$, and Tp is the target temperature value, Tf is the first temperature value, P is the preset target pressure value, k is a coefficient value, and the value of k can be greater than or equal to 4 and smaller than or equal to 6, and may be 5. The preset target pressure value P may be a target pressure value corresponding to each cooking function of the pressure cooking appliance by default, or may be a target pressure value which is set by a user through a control panel.

After calculating the target temperature value Tp, the control device 130 may judge whether the temperature value T within the pot detected by the temperature detection device 110 is greater than the target temperature value Tp. If the temperature value T within the pot is smaller than or equal to the target temperature value Tp, it shows that the temperature value T within the pot does not reach or just reaches the target temperature value Tp, and under this circumstance, the control device 130 may control the heater 140 to heat at a first heating power to increase the temperature value within the pot. If the temperature value T within the pot is greater than the target temperature value Tp, it shows that the temperature value T within the pot has exceeded the target temperature value Tp, and under this circumstance, the control device 130 may control the heater 140 to heat at a second heating power or may control the heater to stop heating to reduce the temperature value within the pot. It will be appreciated that the second heating power is smaller than the first heating power, the second heating power and the first heating power may be set in accordance with specific conditions, for example, the second heating power and the first heating power can be obtained experimentally for different cases. The control device 130 repeatedly carries out the foregoing control process so that the temperature value T within the pot is maintained in the vicinity of the target temperature value Tp, and the pressure within the pot is indirectly controlled to be in the vicinity of the target pressure P until the end of cooking or the start of the next cooking phase.

Under the condition that the floater is not in the floating state, the control device 130 can also control the heating state of the heater 140, and after heating begins, the control device 130 can judge the temperature value T within the pot detected by the temperature detection device 110 is greater than the preset temperature value Ts in real time. If the temperature value T within the pot is not greater than the preset temperature value Ts, the control device 130 can control the heater 140 to heat at a third heating power which is relatively high, thus, the temperature value within the pot can be increased rapidly, and the heating time is shortened. If the temperature value within the pot T is greater than the preset temperature value Ts, the control device 130 can control the heater 140 to heat at a fourth heating power which is relatively low, thus, the temperature value within the pot rises slowly until water in the pressure cooking appliance boils (namely, the floater is in the floating state) to prevent the circumstance that the corresponding control pressure is excessively high due to the fact that the temperature rises sharply. It will be appreciated that the fourth heating power is smaller than the third heating power, the second heating power described above is also smaller than the third heating power, and the second heating power and the fourth heating power may be approximately equal. The third heating power and the fourth heating power may be set in accordance with specific conditions, for example, the third heating power and the fourth heating power may be obtained experimentally for different cases.

The preset temperature value Ts can be greater than or equal to 50 DEG C. and smaller than or equal to 80 DEG C. The set value of the preset temperature value Ts should be smaller than the value of the boiling point of water, and since the values of the boiling point of water are different at different altitudes, but the values of the boiling point of water are greater than 60 DEG C. at any altitude, the preset temperature value Ts can be set to be 60 DEG C. in order to adapt to different altitudes.

Through the control equipment for pressure cooking appliance provided by the embodiment of the disclosure, the heating state of the heater of the pressure cooking appliance can be reasonably controlled at different altitudes based on the target pressure and the values of the boiling point of water at different altitudes, so that the quality of the cooked food cannot be influenced by the altitudes.

Accordingly, the embodiment of the disclosure also provides a pressure cooking appliance which may comprise the control equipment for pressure cooking appliance provided by the embodiment of the disclosure. The pressure cooking appliance can be a pressure cooker, for example, an electric pressure cooker or the like, and through the control equipment, the quality of the food cooked by the pressure cooking appliance can be prevented from being influenced by the altitude, so that the user experiences are improved.

Figure 2:
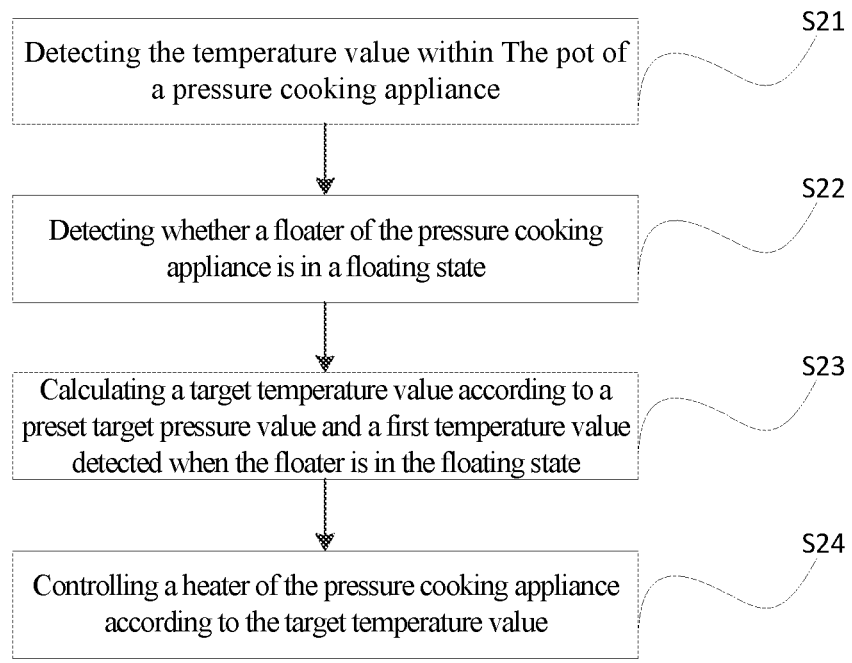
FIG. 2 shows a flow diagram of a control method for pressure cooking appliance according to an embodiment of the disclosure.

FIG. 2 shows a flow diagram of a control method for pressure cooking appliance according to an embodiment of the disclosure. As shown in FIG. 2, the embodiment of the disclosure also provides a control method for pressure cooking appliance, the pressure cooking appliance may be a pressure cooker, for example, an electric pressure cooker or the like, and the method may comprise the following steps:

step S21, detecting a temperature value within a pot of the pressure cooking appliance.

The temperature value within the pot may be detected by any temperature detection device, for example, the temperature detection device can be a temperature sensor, the temperature detection device is generally arranged on a upper lid of the pressure cooking appliance, and is used for detecting the temperature of water vapor inside the pressure cooking appliance in real time, and the temperature of water vapor within the pot is taken as the temperature value within the pot.

Step S22, detecting whether a floater of the pressure cooking appliance is in a floating state.

Under the condition that the temperature value within the pot reaches the boiling point, the floater of the pressure cooking appliance can be in the floating state. The floater detection device can detect whether the floater is in the floating state, and under the condition that the floater is in the floating state, the floater detection device can send out a signal. In one embodiment, the floater can be provided with a magnetic piece, the floater detection device can be a magnetic sensitive element arranged above the floater, under the condition that the floater is in the floating state, the magnetic sensitive element acts and sends a signal to the control device, and the control device can determine that the floater is in the floating state according to the signal sent by the magnetic sensitive element. In one embodiment, the floater detection device can be a mechanical switch, an infrared switch or a magnetic switch and the like. Under the condition that the floater is made of a metal material, a coil can also be arranged above the floater, and the floater detection device can judge whether the floater is in the floating state by measuring change of the magnetic induction intensity in the coil.

Step S23, calculating a target temperature value according to a preset target pressure value and a first temperature value detected when the floater is in the floating state.

The preset target pressure value can be a target pressure value corresponding to each cooking function of the pressure cooking appliance by default, and can also be a target pressure value which is set by the user through the control panel.

For the same cooking appliance, the boiling points of water are different when the pressure cooking appliance is used at different altitudes, so that the detected first temperature values are different when the floater is in the floating state, and, the calculated target temperature values are also different under the condition that the target pressure values are the same.

Step S24, controlling a heater of the pressure cooking appliance according to the target temperature value to maintain the temperature value within the pot in the vicinity of the target temperature value, and the pressure in the pressure cooking appliance is indirectly controlled to be in the vicinity of the target pressure P.

Through the control method for pressure cooking appliance provided by the embodiment of the disclosure, the target pressure can be controlled to be reached by using the corresponding different target temperature values under the condition of different altitudes, so that the quality of the food cooked by the pressure cooking appliance cannot be influenced by the altitude, and the user experiences are improved.

Figure 3:
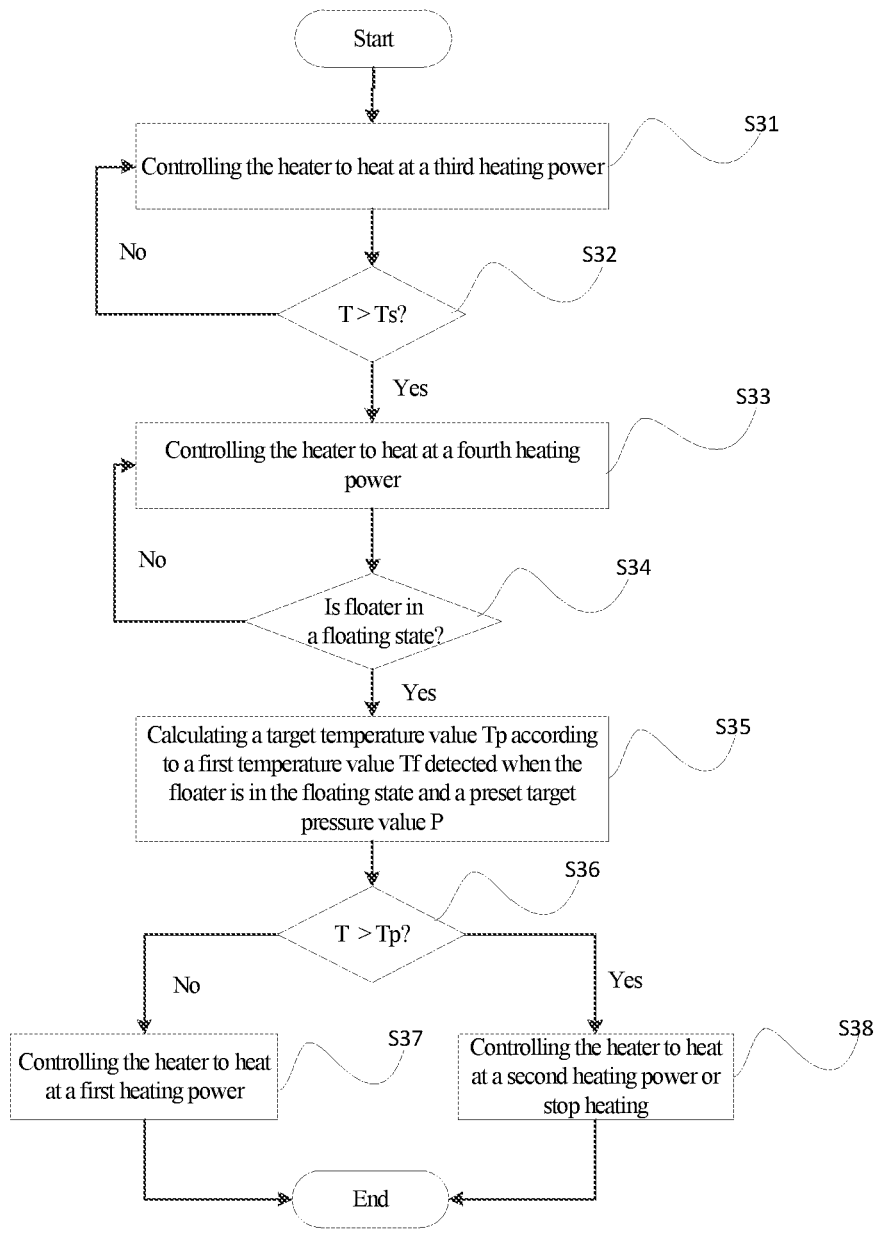
FIG. 3 shows a flow diagram of a control method for pressure cooking appliance according to another embodiment of the disclosure.

FIG. 3 shows a flow diagram of a control method for pressure cooking appliance according to another embodiment of the disclosure. As shown in FIG. 3, in an embodiment, the control method for pressure cooking appliance may comprise the following steps: step S31, controlling the heater to heat firstly at a third heating power which is high relatively after the heater begins to heat, thus, the temperature value within the pot can be rapidly increased, and the heating time is shortened. Step S32, judging whether the temperature value T within the pot is greater than the preset temperature value Ts in real time in a heating process, and the preset temperature value Ts may be greater than or equal to 50 DEG C. and smaller than or equal to 80 DEG C., and is 60 DEG C. If the temperature value T within the pot is not greater than the preset temperature value Ts, the step S31 is still carried out, if the temperature value T within the pot is greater than the preset temperature value Ts, step S33 is carried out. Step S33, controlling the heater to heat at a fourth heating power which is relatively high, thus the temperature value within the pot rises slowly to prevent the circumstance that the corresponding control pressure is over high due to the fact that the temperature rises sharply, and the fourth heating power is smaller than the third heating power. During the heating process of the step S33, whether the floater is in the floating state (step S34) is judged in real time. If the floater is not in the floating state, the step S33 is still carried out. If the floater is in the floating state, it shows that the temperature of the water in the pot reaches the boiling point, and then step S35 is carried out. Step S35, calculating the target temperature value Tp according to the detected first temperature value Tf within the pot when the floater is in the floating state and the preset target pressure value P. A calculating formula may be as follows: $Tp=Tf+P/k$, and Tp is the target temperature value, Tf is the first temperature value, P is the preset target pressure value, k is the coefficient value, and the value of k can be greater than or equal to 4 and smaller than or equal to 6, and may be 5. Step S36, judging whether the temperature value T within the pot is greater than the target temperature value Tp in real time. Step S37, if the temperature value T within the pot is smaller than or equal to the target temperature value Tp, it shows that the temperature value T within the pot does not reach or just reaches the target temperature value Tp, under this circumstance, the heater can be controlled to heat at a first heating power to increase the temperature value within the pot. Step S38, if the temperature value T within the pot is greater than the target temperature value Tp, it shows that the temperature value T within the pot has exceeded the target temperature value Tp, under this circumstance, the heater 140 can be controlled to heat at a second heating power or the heater can be controlled to stop heating to reduce the temperature value within the pot. It will be appreciated that the second heating power is smaller than the first heating power, the first heating power is smaller than the third heating power, and the second heating power and the first heating power may be set in accordance with specific conditions, for example, the second heating power and the first heating power may be obtained experimentally for different cases. Steps S36 to S38 may be repeatedly carried out so that the temperature value T within the pot is maintained in the vicinity of the target temperature value Tp, and the pressure in the pot is indirectly controlled to be in the vicinity of the target pressure P until the end of cooking or the start of the next cooking phase. The heating state of the heater of the pressure cooking appliance is reasonably controlled based on the target pressure and the values of the boiling point of water at different altitudes, so that the quality of the cooked food cannot be affected by the altitude.

The operating principle and benefits of the control method for pressure cooking appliance provided by the embodiment of the disclosure are similar to the operating principle and benefits of the control equipment for pressure cooking appliance provided by the embodiment of the disclosure described above, and it will not be described in detail herein.

Although alternative implementation manners of the embodiments of the disclosure have been described in detail in conjunction with the accompanying drawings, the embodiments of the disclosure are not limited to the details of the above-described implementation manners.

The method of the foregoing embodiments may be completed by a program for instructing associated hardware, and the program is stored in a storage medium, and comprises instructions for enabling a single chip microcomputer, a chip or a processor to carry out all or part of the steps of the methods described in the various embodiments herein. The foregoing storage medium comprises various media for storing program codes such as a USB flash disk, a mobile hard disk, a read-only memory (ROM), a random access memory (RAM), a magnetic disk or an optical disk.

What is claimed is:

1. A control equipment for pressure cooking appliance, comprising:
    a temperature detection device configured to detect a temperature value within a pot of the pressure cooking appliance;
    a floater detection device in communication with the temperature detection device and configured to detect that a floater of the pressure cooking appliance is in a floating state; and
    a control device in communication with the temperature detection device and the floater detection device, and configured to calculate a target temperature value according to a preset target pressure value and a first temperature value detected by the temperature detection device when the floater is in the floating state, and control a heater of the pressure cooking appliance according to the target temperature value;

wherein the control device is configured for calculating the target temperature value according to following formula:

$$Tp=Tf+P/k,$$

wherein Tp is the target temperature value, Tf is the first temperature value, P is the preset target pressure value, and k is a coefficient value.

2. The control equipment for pressure cooking appliance according to claim 1, wherein the control device is configured for controlling the heater of the pressure cooking appliance comprising:
  determining that the temperature value within the pot detected by the temperature detection device is greater than the target temperature value;
  controlling the heater to heat at a first heating power on a condition that the temperature value within the pot detected by the temperature detection device is not greater than the target temperature value; and
  controlling the heater to stop heating or controlling the heater to heat at a second heating power on a condition that the temperature value within the pot detected by the temperature detection device is greater than the target temperature value, characterized in that the second heating power is smaller than the first heating power.

3. The control equipment for pressure cooking appliance according to claim 1, wherein a value of k is greater than or equal to 4 and smaller than or equal to 6.

4. The control equipment for pressure cooking appliance according to claim 1, wherein on a condition that a floater detection device detects that the floater is not in the floating state, the control device is further configured for:
  judging whether the temperature value within the pot detected by the temperature detection device is greater than a preset temperature value;
  controlling the heater to heat at a third heating power on a condition that the temperature value within the pot detected by the temperature detection device is not greater than the preset temperature value; and
  controlling the heater to heat at a fourth heating power on a condition that the temperature value within the pot detected by the temperature detection device is greater than the preset temperature value, wherein the fourth heating power is smaller than the third heating power.

5. The control equipment for pressure cooking appliance according to claim 4, wherein the preset temperature value is greater than or equal to 50 DEG C. and smaller than or equal to 80 DEG C.

6. A pressure cooking appliance, comprising:
  a control equipment for pressure cooking appliance, comprising:
  a temperature detection device, configured for detecting a temperature value within a pot of the pressure cooking appliance;
  a floater detection device, configured for detecting whether a floater of the pressure cooking appliance is in a floating state; and
  a control device, configured for calculating a target temperature value according to a preset target pressure value and a first temperature value detected by the temperature detection device when the floater is in the floating state, and controlling a heater of the pressure cooking appliance according to the target temperature value;

wherein the control device is configured for calculating the target temperature value according to following formula:

$$Tp=Tf+P/k,$$

wherein Tp is the target temperature value, Tf is the first temperature value, P is the preset target pressure value, and k is a coefficient value.

7. A control method for a pressure cooking appliance, comprising:
  detecting a temperature value within a pot of the pressure cooking appliance;
  detecting whether a floater of the pressure cooking appliance is in a floating state;
  calculating a target temperature value according to a preset target pressure value and a first temperature value detected when the floater is in the floating state; and
  controlling a heater of the pressure cooking appliance according to the target temperature value;
  wherein the target temperature value is calculated according to the following formula:

$$Tp=Tf+P/k,$$

wherein Tp is the target temperature value, Tf is the first temperature value, P is the preset target pressure value, and k is a coefficient value.

8. The method for a pressure cooking appliance according to claim 7, wherein controlling the heater of the pressure cooking appliance comprising:
  determining that a detected temperature value within the pot is greater than the target temperature value;
  controlling the heater to heat at a first heating power on a condition that the detected temperature value within the pot is not greater than the target temperature value; and
  controlling the heater to stop heating or controlling the heater to heat at a second heating power on a condition that the detected temperature value within the pot is greater than the target temperature value, wherein the second heating power is smaller than the first heating power.

9. The method for a pressure cooking appliance according to claim 7, wherein a value of k is greater than or equal to 4 and smaller than or equal to 6, and is 5.

10. The method for a pressure cooking appliance according to claim 7, wherein on a condition that it is detected that the floater is not in the floating state, further comprising:
  judging whether the detected temperature value within the pot is greater than a preset temperature value;
  controlling the heater to heat at a third heating power on a condition that the detected temperature value within the pot is not greater than the preset temperature value; and
  controlling the heater to heat at a fourth heating power on a condition that the detected temperature value within the pot is greater than the preset temperature value, wherein the fourth heating power is smaller than the third heating power.

11. The method for a pressure cooking appliance according to claim 10, wherein the preset temperature value is greater than or equal to 50 DEG C. and smaller than or equal to 80 DEG C.

12. The method for a pressure cooking appliance according to claim 9, wherein the preset temperature value is 60 DEG C.

13. The control equipment for pressure cooking appliance according to claim 3, wherein the value of k is 5.

14. The control equipment for pressure cooking appliance according to claim 5, wherein the preset temperature value is 60 DEG C.

15. The control equipment for pressure cooking appliance according to claim 9, wherein the value of k is 5.

* * * * *